(12) United States Patent
Dou et al.

(10) Patent No.: US 11,914,235 B2
(45) Date of Patent: Feb. 27, 2024

(54) VIEWING ANGLE ADJUSTMENT FILM STRUCTURE, MANUFACTURING METHOD THEREOF, AND DISPLAY DEVICE

(71) Applicant: TCL CHINA STAR OPTOELECTRONICS TECHNOLOGY CO., LTD., Shenzhen (CN)

(72) Inventors: Hu Dou, Shenzhen (CN); Ziping Wu, Shenzhen (CN); Gang Yu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 584 days.

(21) Appl. No.: 17/049,966

(22) PCT Filed: Aug. 4, 2020

(86) PCT No.: PCT/CN2020/106684
§ 371 (c)(1),
(2) Date: Oct. 23, 2020

(87) PCT Pub. No.: WO2022/000691
PCT Pub. Date: Jan. 6, 2022

(65) Prior Publication Data
US 2023/0152613 A1    May 18, 2023

(30) Foreign Application Priority Data

Jul. 2, 2020  (CN) .......................... 202010626734.6

(51) Int. Cl.
*G02F 1/1333* (2006.01)
*G02F 1/13* (2006.01)
(Continued)

(52) U.S. Cl.
CPC ...... *G02F 1/1323* (2013.01); *G02F 1/133377* (2013.01); *G02F 1/13363* (2013.01);
(Continued)

(58) Field of Classification Search
CPC ............. G02F 1/1323; G02F 1/133377; G02F 1/133738
See application file for complete search history.

(56) References Cited

U.S. PATENT DOCUMENTS

2002/0047837 A1   4/2002   Suyama et al.
2006/0109396 A1   5/2006   Tsai et al.
(Continued)

FOREIGN PATENT DOCUMENTS

CN    103226257 A    7/2013
CN    104246542 A    12/2014
(Continued)

*Primary Examiner* — Paisley L Wilson
(74) *Attorney, Agent, or Firm* — PV IP PC; Wei Te Chung; Zhigang Ma

(57) ABSTRACT

Disclosed are a viewing angle adjustment film structure, a manufacturing method thereof, and a display device, including a base, an isotropic optical material layer, and a liquid crystal layer stacked in sequence. The isotropic optical material layer is provided with grooves, the liquid crystal layer fills the grooves, and light enters from the liquid crystal layer and then exits through the isotropic optical material layer. Director of liquid crystal molecules in the liquid crystal layer is changed according to an external applied voltage or a change of an electric field, so as to adjust a viewing angle of the light emitted from the isotropic optical material layer.

20 Claims, 4 Drawing Sheets

(51) Int. Cl.
*G02F 1/13363* (2006.01)
*G02F 1/1337* (2006.01)
*G02F 1/1347* (2006.01)
*G02F 1/137* (2006.01)

(52) U.S. Cl.
CPC .... *G02F 1/133738* (2021.01); *G02F 1/13471* (2013.01); *G02F 1/137* (2013.01)

(56) References Cited

U.S. PATENT DOCUMENTS

2010/0026937 A1* 2/2010 Okazaki .............. G02F 1/13471
  349/77
2017/0090237 A1* 3/2017 Kim .................... G02F 1/13475
2018/0088367 A1* 3/2018 Zhong ................. G02F 1/13439

FOREIGN PATENT DOCUMENTS

| CN | 104696876 A | 6/2015 |
| CN | 105589228 A | 5/2016 |
| CN | 107102460 A | 8/2017 |
| CN | 108732797 A | 11/2018 |
| CN | 109613640 A | 4/2019 |
| CN | 210720946 U | 6/2020 |

* cited by examiner

VIEWING ANGLE ADJUSTMENT FILM STRUCTURE, MANUFACTURING METHOD THEREOF, AND DISPLAY DEVICE

This application is a National Phase of PCT Patent Application No. PCT/CN2020/106684 having international filing date of Aug. 4, 2020, which claims the priority of Chinese Application No. 202010626734.6 filed with the Chinese Patent Office on Jul. 2, 2020 and titled "VIEWING ANGLE ADJUSTMENT FILM STRUCTURE, MANUFACTURING METHOD THEREOF, AND DISPLAY DEVICE", which is incorporated herein by reference in its entirety.

FIELD OF INVENTION

The present application relates to the field of display technologies, and more particularly to a viewing angle adjustment film structure, a manufacturing method thereof, and a display device.

BACKGROUND OF INVENTION

With a rapid development of display technologies, a market has higher and higher requirements for resolution of display panels. The higher the resolution of the display panel, the worse the display brightness of the corresponding display panel. Therefore, the display brightness of a large viewing angle decreases. Technical issues urgently needed to be solved for ultra-high-definition display panels.

In the prior art, a viewing angle diffuser film is used to modulate light of a front viewing angle to a large viewing angle, so as to increase the display brightness of the display panel at the large viewing angle. However, this will result in a loss of the display brightness of the front viewing angle of the display panel and substantial reduction in the contrast of the front viewing angle, and an issue of deterioration of display image quality may occur when the display panel is viewed from the front viewing angle.

SUMMARY OF INVENTION

The present application provides a viewing angle adjustment film structure, a manufacturing method thereof, and a display device so as to solve an issue that a current viewing angle diffusion film reduces a front viewing angle display brightness and a front viewing angle contrast of a current display panel, which leads to an issue of deterioration of display quality when viewing the current display panel from a front viewing angle.

In a first aspect, an embodiment of the present application provides a viewing angle adjustment film structure. The viewing angle adjustment film structure comprises a base, an isotropic optical material layer, and a liquid crystal layer stacked in sequence. The isotropic optical material layer is provided with grooves, the liquid crystal layer fills the grooves, and light enters from the liquid crystal layer and then exits through the isotropic optical material layer. Director of liquid crystal molecules in the liquid crystal layer is changed according to an external applied voltage or a change of an electric field, so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer.

In an embodiment, the viewing angle adjustment film structure according further comprises a first electrode and a second electrode, the first electrode is disposed between the base and the isotropic optical material layer, the second electrode is arranged on a side of the liquid crystal layer away from the isotropic optical material layer, and the external applied voltage or the electric field is provided to the liquid crystal layer through the first electrode and the second electrode.

In an embodiment, the viewing angle adjustment film structure further comprises a first alignment film and a second alignment film, the first alignment film is disposed between the isotropic optical material layer and the liquid crystal layer, and the second alignment film is disposed between the liquid crystal layer and the second electrode.

In an embodiment, the viewing angle adjustment film structure further comprises a supporting pad disposed between the isotropic optical material layer and the second electrode, and the supporting pad penetrates the liquid crystal layer.

In an embodiment, a number of the grooves is multiple, and the multiple grooves are arranged at equal intervals.

In an embodiment, the grooves are strip-shaped grooves, and the multiple strip-shaped grooves are arranged at equal intervals in parallel.

In an embodiment, a cross-section of the groove perpendicular to the base is a geometric shape with symmetrical left and right sides, and a width of the cross section gradually increases in a direction away from the base.

In an embodiment, a cross-sectional shape of the groove is an isosceles trapezoid, a U-shape, or a circular arc with a central angle not greater than 180 degrees.

In a second aspect, an embodiment of the present application provides a manufacturing method of a viewing angle adjustment film structure. The manufacturing method of a viewing angle adjustment film structure comprises providing a base; forming an isotropic optical material layer on the base, wherein the isotropic optical material layer is provided with grooves; and forming a liquid crystal layer on the isotropic optical material layer, wherein the liquid crystal layer fills the grooves, light enters from the liquid crystal layer and then exits through the isotropic optical material layer. Director of liquid crystal molecules in the liquid crystal layer is changed according to an external applied voltage or a change of an electric field, so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer.

In an embodiment, before forming the isotropic optical material layer on the base, the manufacturing method of the viewing angle adjustment film structure further comprises forming a first electrode on the base. The manufacturing method of the viewing angle adjustment film structure further comprises forming a second electrode on a substrate. The second electrode is fixed on the liquid crystal layer through the substrate, the second electrode is disposed between the liquid crystal layer and the isotropic optical material layer, and the external applied voltage or the electric field is provided to the liquid crystal layer through the first electrode and the second electrode.

In an embodiment, before forming the liquid crystal layer on the isotropic optical material layer, the manufacturing method of the viewing angle adjustment film structure further comprises forming a first alignment film on the isotropic optical material layer. Before fixing the second electrode on the liquid crystal layer through the substrate, the manufacturing method of the viewing angle adjustment film structure further comprises forming a second alignment film on the second electrode.

In an embodiment, before fixing the second electrode on the liquid crystal layer through the substrate, the manufacturing method of the viewing angle adjustment film structure further comprises forming a supporting pad on the isotropic optical material layer, wherein the supporting pad is disposed between the isotropic optical material layer and the second electrode, and the supporting pad penetrates the liquid crystal layer.

In a third aspect, an embodiment of the present application provides a display device. The display device comprises the viewing angle adjustment film structure of any one of the above and a display panel. The viewing angle adjustment film structure is disposed on a light emitting surface of the display panel, and a viewing angle of light emitted from the light emitting surface is adjusted by the viewing angle adjustment film structure, so as to realize a front viewing angle display and a large viewing angle display of the display panel. The viewing angle adjustment film structure comprises a base, an isotropic optical material layer, and a liquid crystal layer stacked in sequence, the isotropic optical material layer is provided with grooves, the liquid crystal layer fills the grooves, and light enters from the liquid crystal layer and then exits through the isotropic optical material layer; director of liquid crystal molecules in the liquid crystal layer is changed according to an external applied voltage or a change of an electric field, so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer.

In an embodiment, the viewing angle adjustment film structure further comprises a first electrode and a second electrode, the first electrode is disposed between the base and the isotropic optical material layer, the second electrode is arranged on a side of the liquid crystal layer away from the isotropic optical material layer, and the external applied voltage or the electric field is provided to the liquid crystal layer through the first electrode and the second electrode.

In an embodiment, the viewing angle adjustment film structure further comprises a first alignment film and a second alignment film, the first alignment film is disposed between the isotropic optical material layer and the liquid crystal layer, and the second alignment film is disposed between the liquid crystal layer and the second electrode.

In an embodiment, the viewing angle adjustment film structure further comprises a supporting pad disposed between the isotropic optical material layer and the second electrode, and the supporting pad penetrates the liquid crystal layer.

In an embodiment, a number of the grooves is multiple, and the multiple grooves are arranged at equal intervals.

In an embodiment, the grooves are strip-shaped grooves, and the multiple strip-shaped grooves are arranged at equal intervals in parallel.

In an embodiment, a cross-section of the groove perpendicular to the base is a geometric shape with symmetrical left and right sides, and a width of the cross section gradually increases in a direction away from the base.

In an embodiment, the display panel comprises a color filter substrate, an array substrate arranged opposite to the color filter substrate and provided with a plurality of pixel units, and a liquid crystal material layer filled between the color filter substrate and the array substrate, a first polarizer disposed on a side of the color filter substrate away from the liquid crystal material layer, and a second polarizer disposed on a side of the array substrate away from the liquid crystal material layer. The viewing angle adjustment film structure is disposed on a side of the first polarizer away from the color filter substrate, and light emitted by the pixel units in the array substrate exits through the liquid crystal material layer, the color filter substrate, the first polarizer, the base, the liquid crystal layer, and the isotropic light material layer in sequence.

Beneficial Effect:

Compared with the prior art, the viewing angle adjustment film structure provided by the present application includes a base, an isotropic optical material layer, and a liquid crystal layer stacked in sequence, the isotropic optical material layer is provided with grooves, the liquid crystal layer fills the grooves, and light enters from the liquid crystal layer and then exits through the isotropic optical material layer. Director of liquid crystal molecules in the liquid crystal layer is changed according to an external applied voltage or a change of an electric field. In this way, when it is necessary to increase brightness of the light with a large viewing angle, the externally applied voltage or electric field can be controlled to make the director of the liquid crystal molecules perpendicular to the base. A refractive index of the corresponding liquid crystal layer is less than a refractive index of the isotropic optical material layer. When it is necessary to ensure that brightness of the light at a front viewing angle is not affected, the external applied voltage or electric field can also be controlled to make the director of the liquid crystal molecules parallel to the base. The refractive index of the corresponding liquid crystal layer is equal to the refractive index of the isotropic optical material layer, thereby ensuring that brightness and contrast of light under front viewing angles are not reduced. As a result, the viewing angle adjustment film structure can cope with complex use environment requirements, and the viewing angle adjustment film structure is used to replace a current viewing angle diffusion film. This can solve issues of deterioration of display image quality when viewing the display panel from the front viewing angle due to reduction of front viewing angle display brightness and front viewing angle contrast of the display panel by a current viewing angle diffusion film.

DETAILED DESCRIPTION OF PREFERRED EMBODIMENTS

The present application will be further described in detail below with reference to the drawings and embodiments. It is particularly pointed out that the following examples are only used to illustrate the present application, but do not limit the scope of the present application. Likewise, the following embodiments are only part of the embodiments of the present application, but not all embodiments. All other embodiments obtained by a person of ordinary skill in the art without creative work shall fall within the protection scope of the present application.

Figure 1:
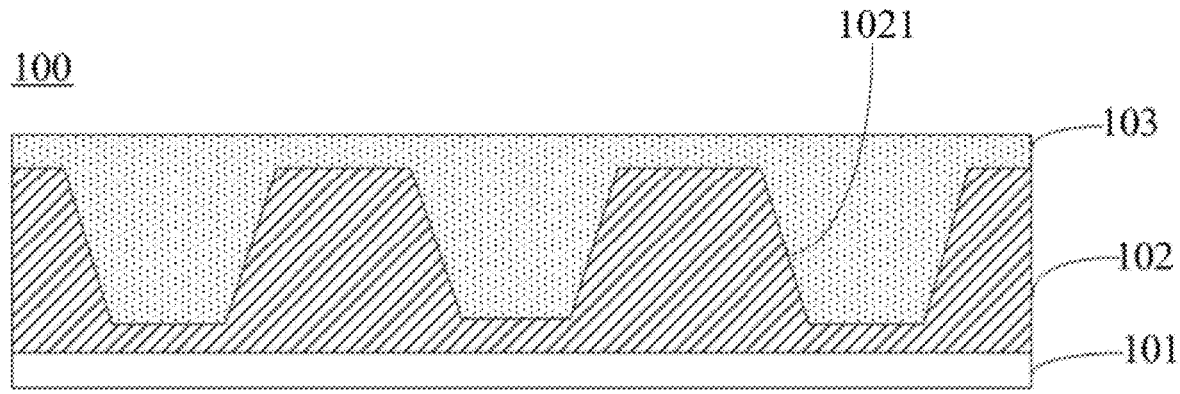
FIG. 1 is a schematic structural diagram of a viewing angle adjustment film structure provided by an embodiment of the present application.
Figure 2:
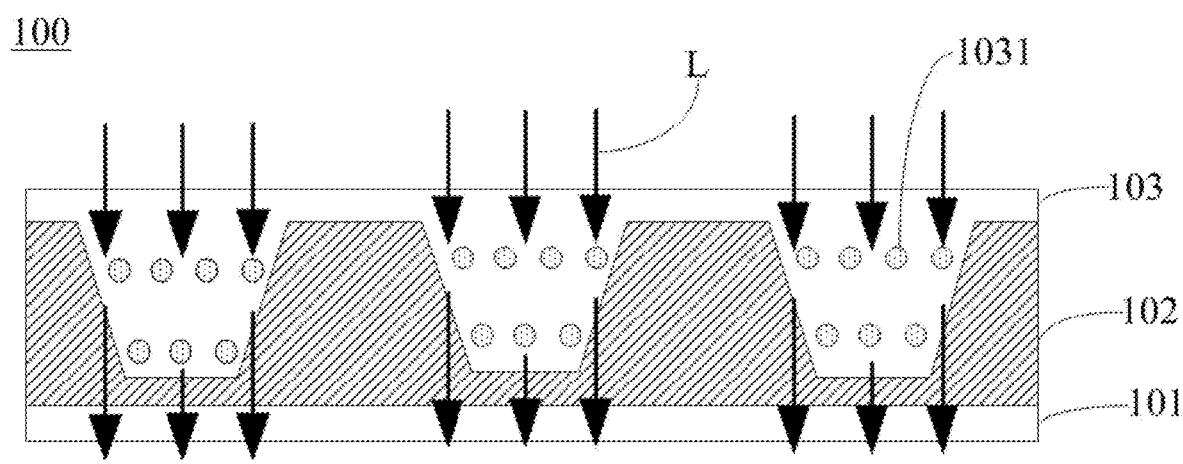
FIG. 2 is a schematic diagram of effect of adjusting a viewing angle of light by a viewing angle adjustment film structure provided by an embodiment of the present application.
Figure 3:
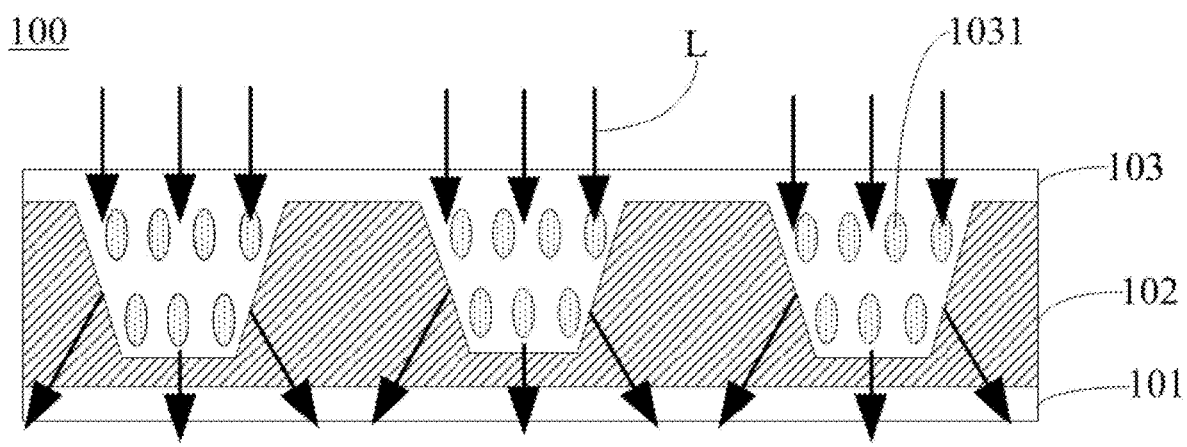
FIG. 3 is another schematic diagram of effect of adjusting a viewing angle of light by a viewing angle adjustment film structure provided by an embodiment of the present application.

Referring to FIG. 1 to FIG. 3, FIG. 1 is a schematic structural diagram of a viewing angle adjustment film structure provided by an embodiment of the present application, FIG. 2 is a schematic diagram of effect of adjusting a viewing angle of light by a viewing angle adjustment film structure provided by an embodiment of the present application, and FIG. 3 is another schematic diagram of effect of adjusting a viewing angle of light by a viewing angle adjustment film structure provided by an embodiment of the present application. As illustrated in FIG. 1 to FIG. 3, the viewing angle adjustment film structure 100 includes a base 101, an isotropic optical material layer 102, and a liquid crystal layer 103 that are sequentially stacked. Grooves 1021 are provided on the isotropic optical material layer 102. The liquid crystal layer 103 fills the grooves 1021. Light L from the outside (for example, a light emitting surface of a display panel) enters the liquid crystal layer 103 and then exits through the isotropic optical material layer 102.

In this embodiment, as illustrated in FIG. 2 and FIG. 3, the above-mentioned liquid crystal layer 103 includes a plurality of liquid crystal molecules 1031, and director of the liquid crystal molecules 1031 in the liquid crystal layer 103 will be changed according to change in external applied voltage or electric field to adjust a viewing angle of the light L emitted from the isotropic optical material layer 102. Specifically, when the director of the liquid crystal molecules 1031 in the liquid crystal layer 103 is parallel to the base 101, as shown in FIG. 2, a refractive index of the liquid crystal layer 103 is the same as a refractive index of the isotropic optical material layer 102. The corresponding light L entering from the liquid crystal layer 103 will not be refracted at an interface of the isotropic optical material layer 102, that is, the viewing angle adjustment film structure 100 will not affect brightness and contrast of the light L at a front viewing angle. Further, when the director of the liquid crystal molecules 1031 in the liquid crystal layer 103 is perpendicular to the base 101, as shown in FIG. 3, the refractive index of the liquid crystal layer 102 is smaller than the refractive index of the isotropic optical material layer 102. Correspondingly, at least part of the light L (for example, incident light at a front viewing angle) incident from the liquid crystal layer 103 will be refracted at the interface of the isotropic optical material layer 103. Therefore, at least part of the incident light from the front viewing angle can be adjusted to light with a large viewing angle, so as to enhance brightness of the light under the large viewing angle. Light with a large viewing angle may refer to light with a viewing angle greater than a preset angle (for example, 45 degrees). Light with a front viewing angle may refer to a light with a viewing angle less than a preset angle (for example, 20 degrees).

During specific implementation, a suitable external applied voltage or electric field can be selected according to actual use scene requirements of the above-mentioned viewing angle adjustment film structure 100. The viewing angle adjustment film structure 100 uses a viewing angle to increase brightness of the light L at a large viewing angle by sacrificing brightness and contrast of the light L at a front viewing angle. Alternatively, the viewing angle adjustment film structure 100 is not used to increase the brightness of the light L at a large viewing angle, thereby ensuring that the brightness and contrast of the light L at a front viewing angle are not reduced. In this way, the viewing angle adjustment film structure 100 in the present application can cope with the requirements of a complex use environment.

The base 101 may be a transparent flexible base such as a polyimide or polysiloxane base, or a transparent rigid base such as a glass or plastic base. Material of the isotropic optical material layer 102 may be UV curable resin or thermosetting resin such as epoxy resin, acrylic resin, urethane resin, silicone resin, or phenol resin. Material of the liquid crystal layer 103 can be a nematic liquid crystal material or a blue phase liquid crystal material. Moreover, when shape of the liquid crystal molecules 1031 in the liquid crystal layer 103 is an elliptical sphere (as shown in FIG. 3) or a rod shape, the director of the liquid crystal molecules 1031 may be a long axis direction of the liquid crystal molecules.

Specifically, a cross section of the groove 1021 perpendicular to the base 101 has a symmetrical geometric shape on left and right sides, and a width of the cross section gradually increases in a direction away from the base 101. In an embodiment, a shape of the above-mentioned cross-section may specifically be an isosceles trapezoid (as shown in FIG. 1), a U-shape, or a circular arc shape with a central angle of not greater than 180 degrees.

Figure 4:
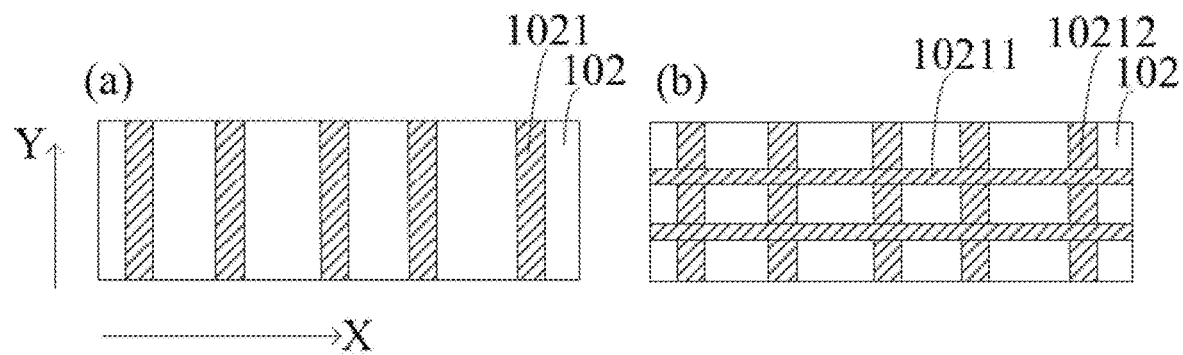
FIG. 4 is a schematic diagram of distribution position of grooves on an isotropic light material layer provided by an embodiment of the present application.

The number of the aforementioned grooves 1021 may be multiple, and the multiple grooves 1021 are arranged at equal intervals. In one embodiment, as shown in a in FIG. 4, the above-mentioned groove 1021 may be specifically a strip-shaped groove, and when the number of grooves 1021 is multiple, the multiple strip-shaped grooves 1021 may be arranged in parallel at equal intervals to adjust the viewing angle of the light L in only one direction (for example, a horizontal direction X). In another embodiment, as shown in b in FIG. 4, when the number of grooves 1021 is multiple, the multiple grooves 1021 may include a first strip-shaped groove 10211 extending in a first direction (for example, the horizontal direction X) and a second strip-shaped groove 10212 extending in a second direction (for example, a vertical direction Y) to adjust the viewing angle of the light L in two directions (for example, the horizontal direction X and the vertical direction Y). In another embodiment, the above-mentioned groove 1021 may also be specifically a prism-shaped groove, and when the number of grooves 1021 is multiple, the multiple prism-shaped grooves may be arranged at equal intervals so as to adjust the viewing angle of light L in multiple directions.

Figure 5:
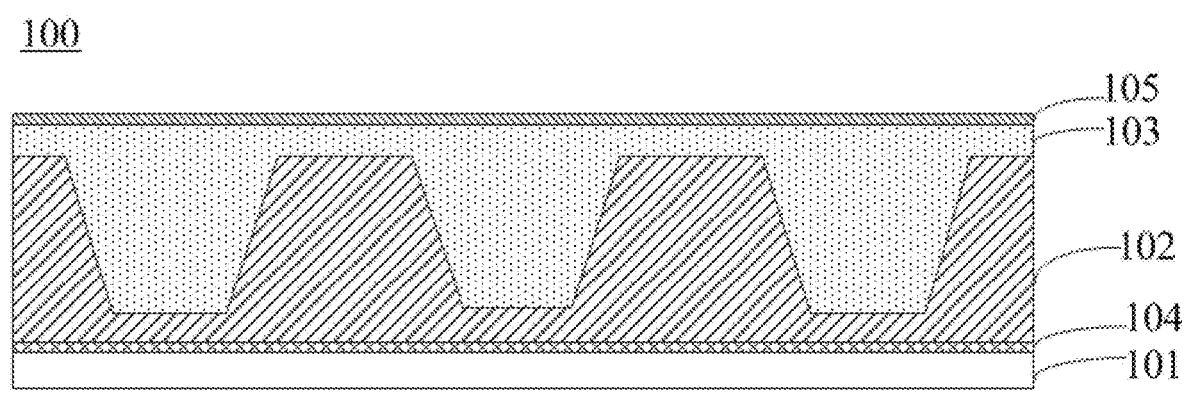
FIG. 5 is another structural diagram of a viewing angle adjustment film structure provided by an embodiment of the present application.

In a specific embodiment, as shown in FIG. 5, the viewing angle adjustment film structure 100 may further include a first electrode 104 and a second electrode 105. The first electrode 104 is disposed between the base 101 and the isotropic optical material layer 102. The second electrode 105 is disposed on a side of the liquid crystal layer 103 away from the isotropic optical material layer 102. Material of the first electrode 104 and material of the second electrode 105 may be a transparent conductive oxide such as indium tin oxide (ITO) or indium titanium oxynitride, or a transparent conductive metal such as silver or copper. In addition, the first electrode 104 and the second electrode 105 can provide the liquid crystal layer 103 with an externally applied voltage or electric field.

Figure 6:
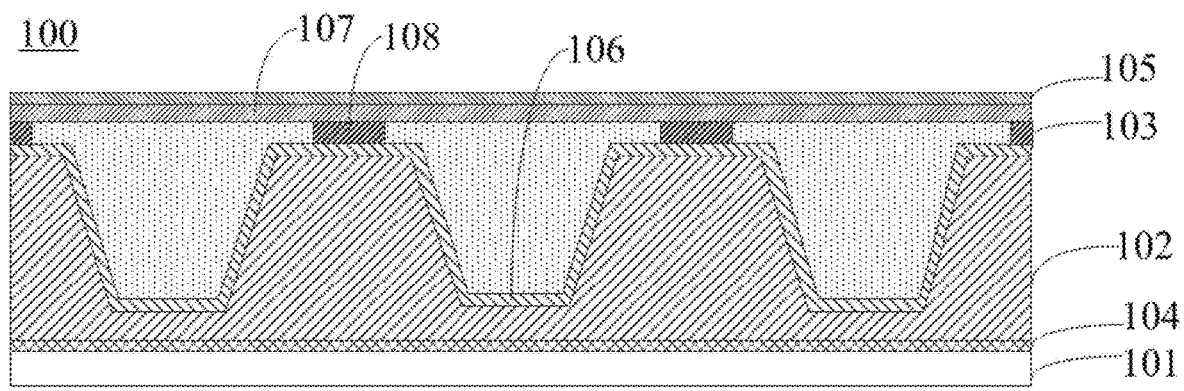
FIG. 6 is another structural diagram of a viewing angle adjustment film structure provided by an embodiment of the present application.

Specifically, as shown in FIG. 6, the above-mentioned viewing angle adjustment film structure 100 may further include a first alignment film 106 and a second alignment film 107. The first alignment film 106 is disposed between the isotropic optical material layer 102 and the liquid crystal layer 103. The second alignment film 107 is disposed between the liquid crystal layer 103 and the second electrode 105. The first alignment film 106 and the second alignment film 107 may be organic (such as polyimide) or inorganic (such as SiO2) alignment films, and the external voltage or electric field is zero, that is, when there is no voltage or electric field is applied to the liquid crystal layer 103, the director of the liquid crystal molecules 1031 can be made parallel to the base 101, wherein a surface of the base 101 is parallel to the horizontal direction.

Moreover, when the voltage applied to the first electrode 104 and the second electrode 105 gradually increases, the director of the liquid crystal molecules 1031 in the liquid crystal layer 103 will gradually deflect from a direction parallel to the base to a direction perpendicular to the base. At the same time, the refractive index of the liquid crystal layer 103 will gradually decrease. Specifically, when the angle between the director of the liquid crystal molecules 1031 and the substrate 101 is θ, an equivalent refractive index $n_{eff}$ of the liquid crystal layer 103 can be calculated according to the following formula:

$$n_{eff} = \frac{n_e n_o}{\sqrt{n_o^2 + (n_e^2 - n_o^2)\sin^2(\theta)}}$$

$n_o$ is o light refractive index of the liquid crystal molecules, and ne is e light refractive index of the liquid crystal molecules.

Figure 7:
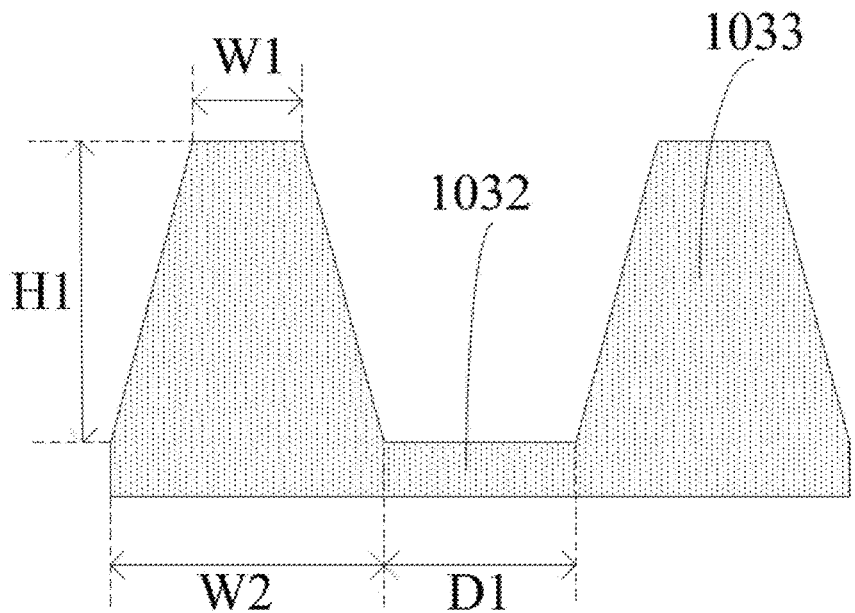
FIG. 7 is a schematic diagram of a structure of a liquid crystal layer provided by an embodiment of the present application.

For a specific example, as shown in FIG. 7, the above-mentioned liquid crystal layer 103 may include a base 1032 and a protrusion 1033 on the base 1032. Shape and size of the protrusion 1033 match shape and size of the groove 1021 on the isotropic light material layer 102 described above. The protrusion 1033 may be obtained by filling the above-mentioned groove 1021 with liquid crystal material. Specifically, the cross-sectional shape of the protrusion 1033 perpendicular to the base 101 may be an isosceles trapezoid. An upper side length W1, a lower side length W2, and a height H1 of the isosceles trapezoid may be 9.56 μm, 15.12 μm, and 16.67 μm, respectively. The separation distance between two adjacent protrusions 1031 may be 8-15 μm. In this example, when the material of the liquid crystal layer 103 is an E7 liquid crystal material, the o light refractive index no of the liquid crystal molecules 1031 in the liquid crystal layer 103 is 1.517, and the e light refractive index ne is 1.741. In some embodiments, a thickness of the aforementioned isotropic optical material layer 102 may range from 5 to 100 μm. A thickness of the liquid crystal layer 103 may range from 5 to 20 μm, for example, 18.8 μm. In addition, in order to avoid leakage of liquid crystal molecules 1031 in the liquid crystal layer 103, a thickness of the isotropic optical material layer 102 may be greater than the thickness of the liquid crystal layer 103, for example, a ratio of the two may be greater than or equal to 2. The thickness of the liquid crystal layer 103 and the thickness of the isotropic optical material layer 102 both refer to a thickness of a region with the largest thickness in the corresponding film layer.

Further, when the voltage applied to the first electrode 104 and the second electrode 105 gradually increases in the order of 2V, 3V, 4V, and 5V, the director of the liquid crystal molecules 1031 in the liquid crystal layer 103 changes from a direction parallel to the base 101. The angle at which the direction is deflected in the direction perpendicular to the base 101 will gradually increase. Moreover, when the voltage applied to the first electrode 104 and the second electrode 105 is greater than or equal to 5V, the director of the liquid crystal molecules 1031 in the liquid crystal layer 103 can be made perpendicular to the base 101. It should be noted that the externally applied voltage required for the deflection of the director of the liquid crystal molecules in the base 1032 that is not covered by the protrusions 1033 in the liquid crystal layer 103 is relatively high. The externally applied voltage required for the deflection of the director of the liquid crystal molecules in the protrusion 1033 is relatively low. Therefore, in this application, the director of the liquid crystal molecules 1031 in the liquid crystal layer 103 perpendicular to the base 101 can mean that the director of the liquid crystal molecules in the protrusion 1033 is perpendicular to the base 101. The director of the liquid crystal molecules in the base 1032 in the liquid crystal layer 103 that is not covered by the protrusions 1033 remains unchanged, that is, parallel to the base 101.

In specific implementation, corresponding director data (for example, the angle between the director of the liquid crystal molecules 1031 and the substrate 101) can be determined according to simulation results of the director of the liquid crystal molecules 1031 in the liquid crystal layer 103 under different external applied voltages. Furthermore, the equivalent refractive index $n_{eff}$ of the liquid crystal layer 103 under different externally applied voltages is calculated. Following the previous example, when the voltage applied to the first electrode 104 and the second electrode 105 gradually increases in the order of 2V, 3V, 4V, 5V, refractive index difference between the isotropic light material layer 102 and the liquid crystal layer 103 in the above-mentioned viewing angle adjustment film structure 100 will become larger and larger, and the refractive index difference will become larger and larger, corresponding viewing angle adjustment ability of the above-mentioned viewing angle adjustment film structure 100 to the incident light L is getting stronger. It should be noted that under ideal circumstances, when the externally applied voltage is 0, the refractive index difference between the liquid crystal layer 103 and the isotropic light material layer 102 in the viewing angle adjustment film structure 100 is zero (not shown in the figure).

In the above embodiment, referring to FIG. 6, the viewing angle adjustment film structure 100 may further include a supporting pad 108. The supporting pad 108 is disposed between the isotropic optical material layer 102 and the second electrode 105 and penetrates the liquid crystal layer 103. This can precisely control thickness of the viewing angle adjustment film structure and ensure thickness uniformity of the viewing angle adjustment film structure. Specifically, hardness of the supporting pad 108 is generally greater than hardness of the isotropic optical material layer 102, and its material may be an organic resin material or an inorganic insulating material. Moreover, when the first alignment film 106 is provided between the isotropic optical material layer 102 and the liquid crystal layer 103, the supporting pad 108 may be specifically arranged between the first alignment film 106 and the isotropic optical material layer 102. Alternatively, the supporting pad 108 may also be disposed between the isotropic optical material layer 102 and the second electrode 105, and may penetrate the first alignment film 106 and the liquid crystal layer 103 at the same time.

Compared with the prior art, the viewing angle adjustment film structure provided by the embodiment includes a base, an isotropic optical material layer, and a liquid crystal layer stacked in sequence, the isotropic optical material layer is provided with grooves, the liquid crystal layer fills the grooves, and light enters from the liquid crystal layer and then exits through the isotropic optical material layer. Director of liquid crystal molecules in the liquid crystal layer is changed according to an external applied voltage or a change of an electric field so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer. Therefore, the viewing angle adjustment film structure can be used to replace a current viewing angle diffusion film, so as to solve an issue of display image quality when viewing the display panel from the front viewing angle due to reduction of display brightness and contrast of the front viewing angle of the display panel, resulting in deterioration of display quality when viewing the display panel from the front viewing angle.

Figure 8:
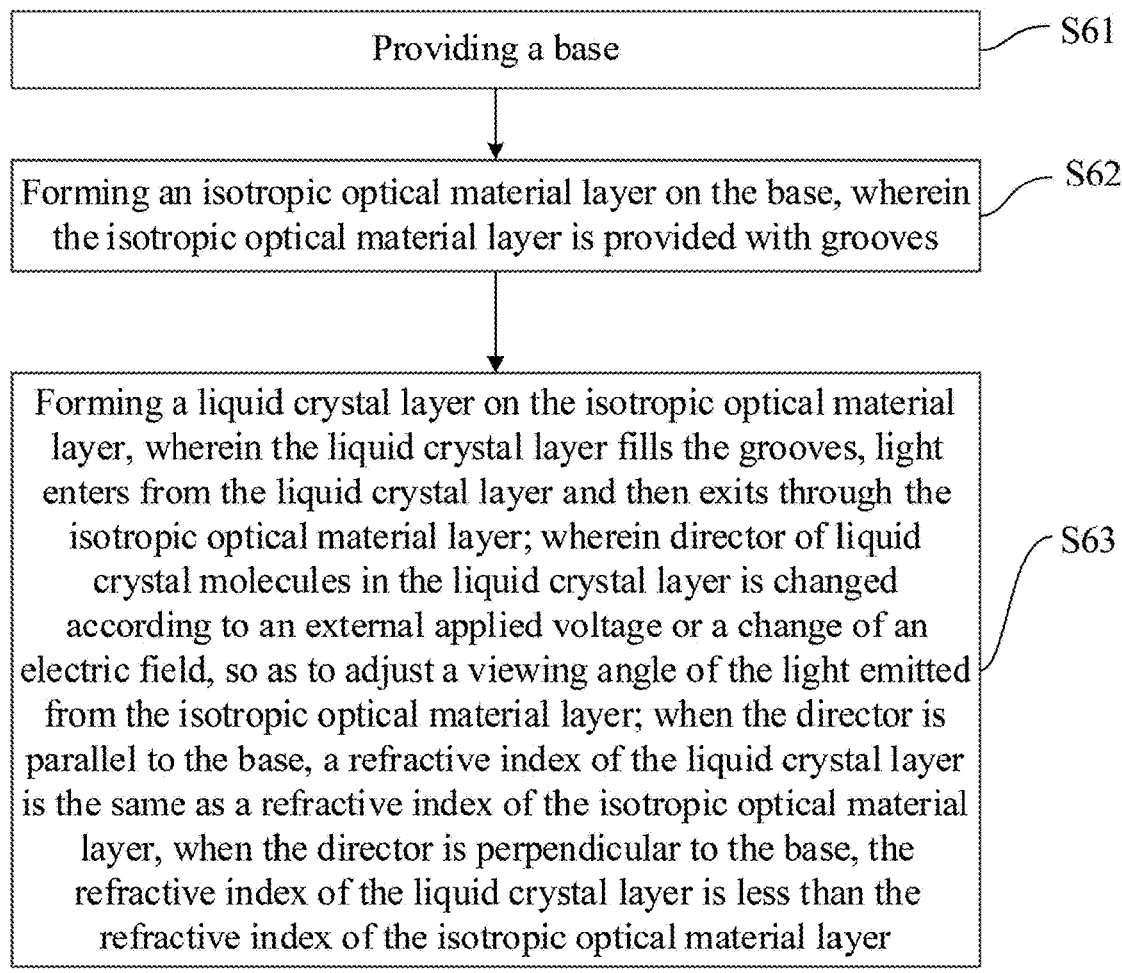
FIG. 8 is a schematic flowchart of a manufacturing method of a viewing angle adjustment film structure provided by an embodiment of the present application.

Referring to FIG. 8, FIG. 8 is a schematic flowchart of a manufacturing method of a viewing angle adjustment film structure provided by an embodiment of the present application. The manufacturing method of the viewing angle adjustment film structure includes the following steps.

S61: providing a base.

The base may be a transparent flexible base such as a polyimide or polysiloxane base, or a transparent rigid base such as a glass or plastic base.

S62: forming an isotropic optical material layer on the base, wherein the isotropic optical material layer is provided with grooves.

Material of the isotropic optical material layer may be UV curable resin or thermosetting resin such as epoxy resin, acrylic resin, urethane resin, silicone resin, or phenol resin. A cross section of the groove perpendicular to the base has a symmetrical geometric shape on left and right sides, and a width of the cross section gradually increases in a direction away from the base. In an embodiment, a shape of the above-mentioned cross-section may specifically be an isosceles trapezoid, a U-shape, or a circular arc shape with a central angle of not greater than 180 degrees.

In details, the number of the aforementioned grooves may be multiple, and the multiple grooves are arranged at equal intervals. In one embodiment, the above-mentioned groove may be specifically a strip-shaped groove, and when the number of grooves is multiple, the multiple strip-shaped grooves may be arranged in parallel at equal intervals to adjust the viewing angle of the light in only one direction (for example, a horizontal direction). In another embodiment, when the number of grooves is multiple, the multiple grooves may include a first strip-shaped groove extending in a first direction (for example, the horizontal direction) and a second strip-shaped groove extending in a second direction (for example, a vertical direction) to adjust the viewing angle of the light in two directions (for example, the horizontal direction and the vertical direction). In another embodiment, the above-mentioned groove may also be specifically a prism-shaped groove, and when the number of grooves is multiple, the multiple prism-shaped grooves may be arranged at equal intervals so as to adjust the viewing angle of light in multiple directions.

In specific implementation, an isotropic optical material can be coated on the base to obtain an initial layer. Grooves are embossed on an upper surface of the initial layer. Then, the initial layer is cured by ultraviolet light or heating to obtain an isotropic optical material layer.

S63: forming a liquid crystal layer on the isotropic optical material layer, wherein the liquid crystal layer fills the grooves, light enters from the liquid crystal layer and then exits through the isotropic optical material layer; wherein director of liquid crystal molecules in the liquid crystal layer is changed according to an external applied voltage or a change of an electric field, so as to adjust a viewing angle of the light emitted from the isotropic optical material layer; when the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer.

Specifically, when the director of the liquid crystal molecules 1031 in the liquid crystal layer 103 is parallel to the base 101, as shown in FIG. 2, a refractive index of the liquid crystal layer 103 is the same as a refractive index of the isotropic optical material layer 102. The corresponding light L entering from the liquid crystal layer 103 will not be refracted at an interface of the isotropic optical material layer 102, that is, the viewing angle adjustment film structure 100 will not affect brightness and contrast of the light L at a front viewing angle. Further, when the director of the liquid crystal molecules 1031 in the liquid crystal layer 103 is not perpendicular to the base 101, as shown in FIG. 3, the refractive index of the liquid crystal layer 102 is smaller than the refractive index of the isotropic optical material layer 102. Correspondingly, at least part of the light L (for example, incident light at a front viewing angle) incident from the liquid crystal layer 103 will be refracted at the interface of the isotropic optical material layer 103. Therefore, at least part of the incident light from the front viewing angle can be adjusted to light with a large viewing angle, so as to enhance brightness of the light under the large viewing angle. During specific implementation, a suitable external applied voltage or electric field can be selected according to actual use scene requirements of the above-mentioned viewing angle adjustment film structure 100. The viewing angle adjustment film structure 100 uses a viewing angle to increase brightness of the light L at a large viewing angle by sacrificing brightness and contrast of the light L at a front viewing angle. Alternatively, the viewing angle adjustment film structure 100 is not used to increase the brightness of the light L at a large viewing angle, thereby ensuring that the brightness and contrast of the light L at a front viewing angle are not reduced. In this way, the viewing angle adjustment film structure 100 in the present application can cope with the requirements of a complex use environment.

Material of the liquid crystal layer 103 can be a nematic liquid crystal material or a blue phase liquid crystal material. Moreover, when shape of the liquid crystal molecules 1031 in the liquid crystal layer 103 is an elliptical sphere (as shown in FIG. 3) or a rod shape, the director of the liquid crystal molecules 1031 may be a long axis direction of the liquid crystal molecules.

In an embodiment, before S62, it may further include:

S64: forming a first electrode on the base.

The above S62 may include: forming an isotropic optical material layer on the base on which the first electrode is formed.

The manufacturing method of the viewing angle adjustment film structure further comprises:

S65: forming a second electrode on a substrate.

The substrate may be a transparent flexible base such as a polyimide or polysiloxane base, or a transparent rigid base such as a glass or plastic base.

S66: the second electrode is fixed on the liquid crystal layer through the substrate, the second electrode is disposed between the liquid crystal layer and the isotropic optical material layer, and the external applied voltage or the electric field is provided to the liquid crystal layer through the first electrode and the second electrode.

Material of the first electrode 104 and material of the second electrode 105 may be a transparent conductive oxide such as indium tin oxide (ITO) or indium titanium oxynitride, or a transparent conductive metal such as silver or copper. In addition, in specific implementation, a frame sealant may be provided between an edge area of the base and an edge area of the substrate to bond the substrate to the base, so that the second electrode can be fixed on the liquid crystal layer.

In a specific embodiment, before the foregoing S63, it may further include:

S67: forming a first alignment film on the isotropic optical material layer, wherein the first alignment film is disposed between the isotropic optical material layer and the liquid crystal layer.

And, before the above S66, it may also include:

S68: forming a second alignment film on the second electrode, wherein the second alignment film is disposed between the liquid crystal layer and the second electrode.

The first alignment film and the second alignment film may be organic (such as polyimide) or inorganic (such as SiO2) alignment films, and the external voltage or electric field is zero, that is, when there is no voltage or electric field is applied to the liquid crystal layer, the director of the liquid crystal molecules can be made parallel to the base, wherein a surface of the base is parallel to the horizontal direction.

In some embodiments, before the foregoing S66, it may further include:

S69: forming a supporting pad on the isotropic optical material layer, wherein the supporting pad is disposed between the isotropic optical material layer and the second electrode, and the supporting pad penetrates the liquid crystal layer.

In an embodiment, hardness of the supporting pad is generally greater than hardness of the isotropic optical material layer, and its material may be an organic resin material or an inorganic insulating material. Moreover, when the first alignment film is provided between the isotropic optical material layer and the liquid crystal layer, the supporting pad may be specifically arranged between the first alignment film and the isotropic optical material layer. Alternatively, the supporting pad may also be disposed between the isotropic optical material layer and the second electrode, and may penetrate the first alignment film and the liquid crystal layer at the same time. In this way, the thickness of the viewing angle adjustment film structure can be precisely controlled by the supporting pad, and the thickness uniformity of the viewing angle adjustment film structure can be ensured.

Compared with the prior art, the manufacturing method of the viewing angle adjustment film structure provided by the embodiment includes providing a base, forming an isotropic optical material layer on the base, wherein the isotropic optical material layer is provided with grooves, and forming a liquid crystal layer on the isotropic optical material layer, wherein the liquid crystal layer fills the grooves Light enters from the liquid crystal layer and then exits through the isotropic optical material layer. Director of liquid crystal molecules in the liquid crystal layer is changed according to an external applied voltage or a change of an electric field so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer. Therefore, the viewing angle adjustment film structure can be used to replace a current viewing angle diffusion film, so as to solve an issue of display image quality when viewing the display panel from the front viewing angle due to reduction of display brightness and contrast of the front viewing angle of the display panel, resulting in deterioration of display quality when viewing the display panel from the front viewing angle.

Figure 9:
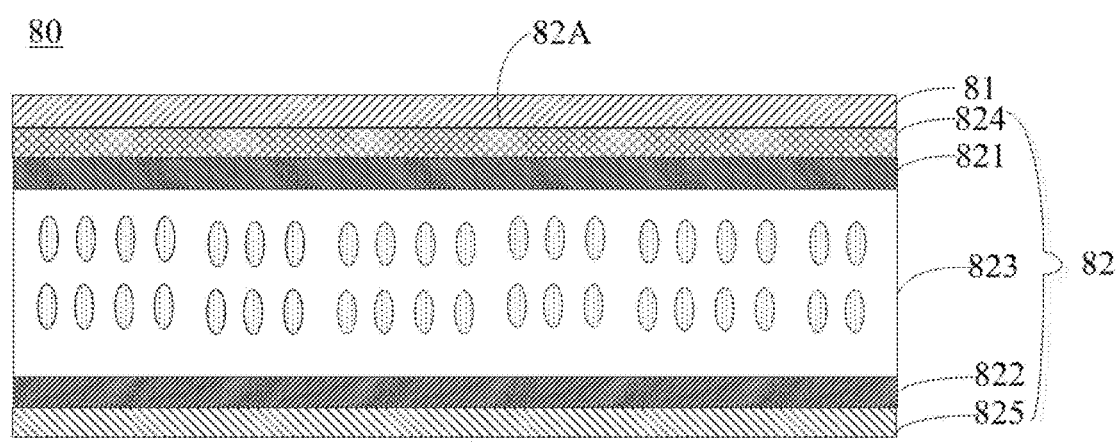
FIG. 9 is a schematic structural diagram of a display device provided by an embodiment of the present application.

Referring to FIG. 9, FIG. 9 is a schematic structural diagram of a display device provided by an embodiment of the present application. The display device 80 includes the viewing angle adjustment film structure 81 of any of the above embodiments and a display panel 82. The viewing angle adjustment film structure 81 is disposed on a light emitting surface 82A of the display panel 82, and a viewing angle of light emitted from the light emitting surface 82A is adjusted by the viewing angle adjustment film structure 81, so as to realize a front viewing angle display and a large viewing angle display of the display panel 82.

In details, the viewing angle adjustment film structure 81 may comprise a base, an isotropic optical material layer, and a liquid crystal layer stacked in sequence. The isotropic optical material layer is provided with grooves, the liquid crystal layer fills the grooves, and light enters from the liquid crystal layer and then exits through the isotropic optical material layer; wherein director of liquid crystal molecules in the liquid crystal layer is changed according to an external applied voltage or a change of an electric field, so as to adjust a viewing angle of the light emitted from the isotropic optical material layer. When the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer.

In a specific embodiment, continuing to refer to FIG. 9, the above-mentioned display panel 82 may include a color filter substrate 821, an array substrate 822 arranged opposite to the color filter substrate 821 and provided with a plurality of pixel units, and a liquid crystal material layer 823 filled between the color filter substrate 821 and the array substrate 822, a first polarizer 824 disposed on a side of the color filter substrate 821 away from the liquid crystal material layer 823, and a second polarizer 825 disposed on a side of the array substrate 822 away from the liquid crystal material layer 823. The viewing angle adjustment film structure 81 is disposed on a side of the first polarizer 824 away from the color filter substrate 821, and light emitted by the pixel units in the array substrate 822 exits through the liquid crystal material layer 823, the color filter substrate 821, the first polarizer 824, the base, the liquid crystal layer, and the isotropic light material layer in sequence.

The large viewing angle display of the display panel 82 corresponds to an application scenario where multiple people watch the display panel. In this case, a sufficiently large external applied voltage or electric field can be provided to the liquid crystal layer in the viewing angle adjustment film structure 81. This enables the director of the liquid crystal molecules in the liquid crystal layer to be deflected by a preset angle from a direction parallel to the substrate to a direction perpendicular to the substrate. The larger the preset angle, the larger the external applied voltage or electric field that needs to be provided to the liquid crystal layer, and the greater the refractive index difference between the liquid crystal layer and the isotropic optical material layer. The above-mentioned viewing angle adjustment film structure 81 has a stronger ability to adjust the viewing angle of the light emitted from the light emitting surface 82A of the display panel 82. During specific implementation, the externally applied voltage or electric field provided to the liquid crystal layer can be dynamically adjusted according to a real-time requirement of the viewing angle when viewing the display panel. This can realize real-time adjustment of the viewing angle of the emitted light. For example, when the required viewing angle becomes larger, the externally applied voltage or electric field provided to the liquid crystal layer can be increased. In this way, it is beneficial to improve a user viewing experience of the display panel.

The front-view display of the display panel 82 corresponds to an application scenario where a single person views the display panel. In this case, it can be considered that there is no need to increase brightness of the light emitted from the light emitting surface 82A at a large viewing angle. That is, there is no need to provide an externally applied voltage or electric field to the liquid crystal layer. Or the supplied externally applied voltage or electric field is zero. Therefore, it can be ensured that the viewing angle adjustment film structure 81 will not affect the brightness and contrast of the light emitted from the light emitting surface 82A at a front viewing angle, thereby solving the issue of deterioration of display quality when viewing the display panel from a front viewing angle.

Different from the prior art, in the display device of this embodiment, by providing a viewing angle adjustment film structure on the light emitting surface of the display panel, the viewing angle adjustment film structure can be used to replace a current viewing angle diffusion film. This can solve the issue of deterioration of display image quality when viewing the display panel from the front viewing angle due to reduction of the front viewing angle display brightness and the front viewing angle contrast of the display panel by the current viewing angle diffusion film.

The above descriptions are only preferred embodiments of the present application and are not intended to limit the present application. Any modification, equivalent replacement, and improvement made within the spirit and principle of the present application shall be included in the protection scope of the present application.

What is claimed is:

1. A viewing angle adjustment film structure, comprising:
a base, an isotropic optical material layer, and a liquid crystal layer stacked in sequence, wherein the isotropic optical material layer is provided with grooves, the liquid crystal layer fills the grooves, and light enters from the liquid crystal layer and then exits through the isotropic optical material layer;
wherein a director of liquid crystal molecules in the liquid crystal layer is changed according to an external applied voltage or a change of an electric field, so as to adjust a viewing angle of the light emitted from the isotropic optical material layer;
when the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer;
wherein a thickness of the isotropic optical material layer is greater than a thickness of the liquid crystal layer, a ratio of the thickness of the isotropic optical material layer and the thickness of the liquid crystal layer is greater than or equal to 2, the thickness of the liquid crystal layer refers to a thickness of a region with a largest thickness in the liquid crystal layer, and the thickness of the isotropic optical material layer refers to a thickness of a region with a largest thickness in the isotropic optical material layer;
wherein the liquid crystal layer comprises a base part and protrusions on the base part, a shape and a size of each of the protrusions match a shape and a size of each of the grooves on the isotropic optical material layer, a cross-sectional shape of each of the protrusions perpendicular to the base part is an isosceles trapezoid, an upper side length, a lower side length, and a height of the isosceles trapezoid are 9.56 μm, 15.12 μm, and 16.67 μm, respectively, and a separation distance between two adjacent protrusions is 8-15 μm.

2. The viewing angle adjustment film structure according to claim 1, further comprising a first electrode and a second electrode, wherein the first electrode is disposed between the base and the isotropic optical material layer, the second electrode is arranged on a side of the liquid crystal layer away from the isotropic optical material layer, and the external applied voltage or the electric field is provided to the liquid crystal layer through the first electrode and the second electrode.

3. The viewing angle adjustment film structure according to claim 2, further comprising a first alignment film and a second alignment film, wherein the first alignment film is disposed between the isotropic optical material layer and the liquid crystal layer, and the second alignment film is disposed between the liquid crystal layer and the second electrode.

4. The viewing angle adjustment film structure according to claim 2, further comprising a supporting pad disposed between the isotropic optical material layer and the second electrode.

5. The viewing angle adjustment film structure according to claim 1, wherein a number of the grooves is multiple, and the multiple grooves are arranged at equal intervals.

6. The viewing angle adjustment film structure according to claim 5, wherein the grooves are strip-shaped grooves, and the multiple strip-shaped grooves are arranged at equal intervals in parallel.

7. The viewing angle adjustment film structure according to claim 1, wherein a cross-section of the grooves perpendicular to the base is a geometric shape with symmetrical left and right sides, and a width of the cross section gradually increases in a direction away from the base.

8. The viewing angle adjustment film structure according to claim 7, wherein a cross-sectional shape of the grooves is an isosceles trapezoid, a U-shape, or a circular arc with a central angle not greater than 180 degrees.

9. A manufacturing method of a viewing angle adjustment film structure, comprising:
  providing a base;
  forming an isotropic optical material layer on the base, wherein the isotropic optical material layer is provided with grooves; and
  forming a liquid crystal layer on the isotropic optical material layer, wherein the liquid crystal layer fills the grooves, light enters from the liquid crystal layer and then exits through the isotropic optical material layer;
  wherein a director of liquid crystal molecules in the liquid crystal layer is changed according to an external applied voltage or a change of an electric field, so as to adjust a viewing angle of the light emitted from the isotropic optical material layer;
  when the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer;
  wherein a thickness of the isotropic optical material layer is greater than a thickness of the liquid crystal layer, a ratio of the thickness of the isotropic optical material layer and the thickness of the liquid crystal layer is greater than or equal to 2, the thickness of the liquid crystal layer refers to a thickness of a region with a largest thickness in the liquid crystal layer, and the thickness of the isotropic optical material layer refers to a thickness of a region with a largest thickness in the isotropic optical material layer;
  wherein the liquid crystal layer comprises a base part and protrusions on the base part, a shape and a size of each of the protrusions match a shape and a size of each of the grooves on the isotropic optical material layer, a cross-sectional shape of each of the protrusions perpendicular to the base part is an isosceles trapezoid, an upper side length, a lower side length, and a height of the isosceles trapezoid are 9.56 μm, 15.12 μm, and 16.67 μm, respectively, and a separation distance between two adjacent protrusions is 8-15 μm.

10. The manufacturing method of the viewing angle adjustment film structure according to claim 9, wherein before forming the isotropic optical material layer on the base, the manufacturing method of the viewing angle adjustment film structure further comprises:
  forming a first electrode on the base;
  wherein the manufacturing method of the viewing angle adjustment film structure further comprises:
  forming a second electrode on a substrate;
  wherein the second electrode is fixed on the liquid crystal layer through the substrate, the liquid crystal layer is disposed between the second electrode and the isotropic optical material layer, and the external applied voltage or the electric field is provided to the liquid crystal layer through the first electrode and the second electrode.

11. The manufacturing method of the viewing angle adjustment film structure according to claim 10, wherein before forming the liquid crystal layer on the isotropic optical material layer, the manufacturing method of the viewing angle adjustment film structure further comprises:
  forming a first alignment film on the isotropic optical material layer;
  wherein before fixing the second electrode on the liquid crystal layer through the substrate, the manufacturing method of the viewing angle adjustment film structure further comprises:
  forming a second alignment film on the second electrode.

12. The manufacturing method of the viewing angle adjustment film structure according to claim 10, wherein before fixing the second electrode on the liquid crystal layer through the substrate, the manufacturing method of the viewing angle adjustment film structure further comprises:
  forming a supporting pad on the isotropic optical material layer, wherein the supporting pad is disposed between the isotropic optical material layer and the second electrode.

13. A display device, comprising:
  a viewing angle adjustment film structure and a display panel, wherein the viewing angle adjustment film structure is disposed on a light emitting surface of the display panel, and a viewing angle of light emitted from the light emitting surface is adjusted by the viewing angle adjustment film structure, so as to realize a front viewing angle display and a large viewing angle display of the display panel;
  wherein the viewing angle adjustment film structure comprises a base, an isotropic optical material layer, and a liquid crystal layer stacked in sequence, wherein the isotropic optical material layer is provided with grooves, the liquid crystal layer fills the grooves, and light enters from the liquid crystal layer and then exits through the isotropic optical material layer; wherein a director of liquid crystal molecules in the liquid crystal layer is changed according to an external applied voltage or a change of an electric field, so as to adjust a viewing angle of the light emitted from the isotropic optical material layer;
  when the director is parallel to the base, a refractive index of the liquid crystal layer is the same as a refractive index of the isotropic optical material layer; when the director is perpendicular to the base, the refractive index of the liquid crystal layer is less than the refractive index of the isotropic optical material layer;
  wherein a thickness of the isotropic optical material layer is greater than a thickness of the liquid crystal layer, a ratio of the thickness of the isotropic optical material layer and the thickness of the liquid crystal layer is greater than or equal to 2, the thickness of the liquid crystal layer refers to a thickness of a region with a largest thickness in the liquid crystal layer, and the thickness of the isotropic optical material layer refers to a thickness of a region with a largest thickness in the isotropic optical material layer;
  wherein the liquid crystal layer comprises a base part and protrusions on the base part, a shape and a size of each of the protrusions match a shape and a size of each of the grooves on the isotropic optical material layer, a cross-sectional shape of each of the protrusions perpendicular to the base part is an isosceles trapezoid, an upper side length, a lower side length, and a height of the isosceles trapezoid are 9.56 µm, 15.12 µm, and 16.67 µm, respectively, and a separation distance between two adjacent protrusions is 8-15 µm.

14. The display device according to claim 13, wherein the viewing angle adjustment film structure further comprises a first electrode and a second electrode, the first electrode is disposed between the base and the isotropic optical material layer, the second electrode is arranged on a side of the liquid crystal layer away from the isotropic optical material layer, and the external applied voltage or the electric field is provided to the liquid crystal layer through the first electrode and the second electrode.

15. The display device according to claim 14, wherein the viewing angle adjustment film structure further comprises a first alignment film and a second alignment film, the first alignment film is disposed between the isotropic optical material layer and the liquid crystal layer, and the second alignment film is disposed between the liquid crystal layer and the second electrode.

16. The display device according to claim 14, wherein the viewing angle adjustment film structure further comprises a supporting pad disposed between the isotropic optical material layer and the second electrode.

17. The display device according to claim 13, wherein a number of the grooves is multiple, and the multiple grooves are arranged at equal intervals.

18. The display device according to claim 17, wherein the grooves are strip-shaped grooves, and the multiple strip-shaped grooves are arranged at equal intervals in parallel.

19. The display device according to claim 13, wherein a cross-section of the groove perpendicular to the base is a geometric shape with symmetrical left and right sides, and a width of the cross section gradually increases in a direction away from the base.

20. The display device according to claim 13, wherein the display panel comprises a color filter substrate, an array substrate arranged opposite to the color filter substrate and provided with a plurality of pixel units, and a liquid crystal material layer filled between the color filter substrate and the array substrate, a first polarizer disposed on a side of the color filter substrate away from the liquid crystal material layer, and a second polarizer disposed on a side of the array substrate away from the liquid crystal material layer, wherein the viewing angle adjustment film structure is disposed on a side of the first polarizer away from the color filter substrate, and light emitted by the pixel units in the array substrate exits through the liquid crystal material layer, the color filter substrate, the first polarizer, the liquid crystal layer, the isotropic optical material layer, and the base in sequence.

* * * * *